United States Patent

[11] 3,607,132

[72] Inventor  Lamar F. Sudduth
              Tulsa, Okla.
[21] Appl. No. 855,473
[22] Filed     Sept. 5, 1969
[45] Patented  Sept. 21, 1971
[73] Assignee  Amoco Production Company
              Tulsa, Okla.

[54] VERTICAL SULFUR RECOVERY PLANT
     4 Claims, 8 Drawing Figs.
[52] U.S. Cl. .................................................. 23/288 K,
                              23/262, 23/225 P, 122/4
[51] Int. Cl. ..................................................... B01j 9/04,
                                                    C01b 17/04
[50] Field of Search ........................................... 23/288,
                                              262, 225, 225.1, 226

[56]            References Cited
                UNITED STATES PATENTS
2,758,913  8/1956   Pearce ............................ 23/225.1
2,939,769  6/1960   Webb .............................. 23/262
3,057,698  10/1962  Grekel et al. ................... 23/262

Primary Examiner—James H. Tayman, Jr.
Attorneys—Paul F. Hawley and Arthur McIlroy ABSTRACT: Apparatus for recovery of sulfur from hydrogen sulfide is described in which the catalyst chambers, condensing and boiler sections, and liquid-gas separator compartments are serially arranged. A separate condensing section is provided for each of the catalyst chambers while sulfur produced in the boiler is condensed in the second pass tubes comprising the boiler section, and flows into a separator compartment. Liquid sulfur seals connect the separator compartments, and liquid sulfur is discharged from one of them.

INVENTOR.
LAMAR F. SUDDUTH
BY
ATTORNEY

VERTICAL SULFUR RECOVERY PLANT

BACKGROUND OF THE INVENTION

The present invention relates to an improved apparatus for the recovery of elemental sulfur from hydrogen sulfide. More particularly, it is concerned with compact apparatus requiring a minimum of exterior piping and area for installation.

With the emphasis on prevention of air pollution, and on the recovery of sulfur as a byproduct in gasoline plants and refineries, there has been considerable interest in small volume, low cost sulfur plants which can be installed in a limited space. One design of such plants is described and claimed in Webb U.S. Pat. No. 2,939,769. This type of plant, although relatively compact, requires considerable exterior piping as well as a substantial foundation.

SUMMARY OF THE INVENTION

The apparatus of my invention comprises a generally cylindrical vessel having serially arranged therein a catalyst chamber or chambers, separate condensing and boiler sections, and a separate liquid-gas disengaging section cooperating with each of said condensing and boiler sections. As a result of these different compartments of the apparatus being arranged in tandem relationship, the unit can be installed in a vertical position with the gas-disengaging section thereof forming the base. For example, a plant of about 25 tons per day capacity, requires an area of less than 100 square feet for installation, whereas will a plant of the Webb design of similar capacity, an area of about 1,000 square feet is needed. Such a difference in foundation space can become very important in an already crowded refinery. This design is an improvement over the over described in the above-identified patent in that exterior piping, foundations and field construction costs are minimized. Cost of a plant having the design of my invention should not be more than 75 percent of a plant of the design described in U.S. Pat. No. 2,939,769 having similar capacity. The sulfur plant design of my invention occupies less space than plants of current design and is adapted to installations for which space is limited. The total pressure drop through the plant is lower because of less external piping than is encountered in other designs, thereby reducing process air blower power requirements.

Antipollution regulations in numerous states limit the quantity of hydrogen sulfide and/or sulfur dioxide which can be liberated to the atmosphere. In many instances the quantity of recoverable sulfur is small, and sulfur recovery plant construction cost is not justified on the basis of sulfur value alone. However, as pointed out above, the design of my invention generally reduces the cost of small plants by about 25 percent, compared to the investment required for plants of similar size and of known design.

SPECIFIC EMBODIMENTS OF THE INVENTION

My invention will be further illustrated by reference to the accompanying drawings, wherein.

Figure 1:
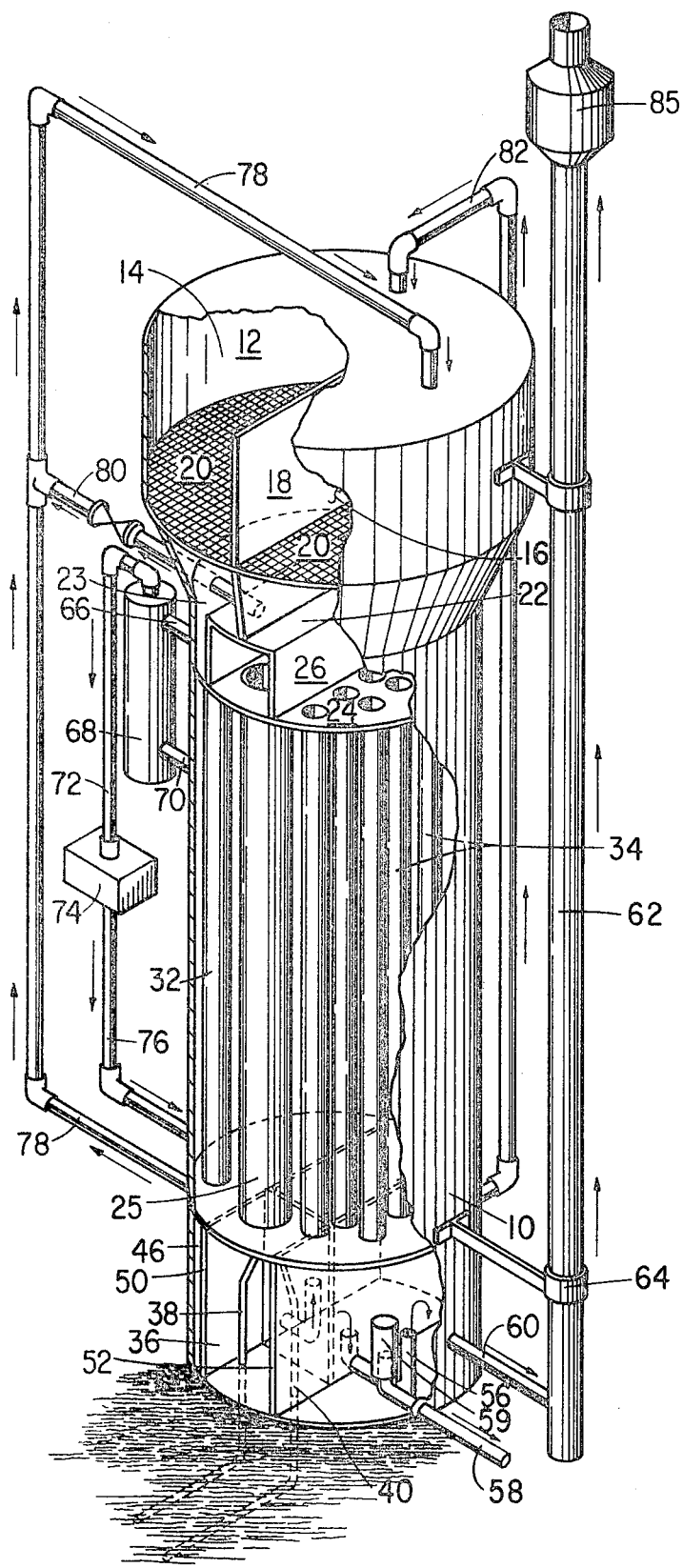
FIG. 1 is an isometric view, partly in section, illustrating the novel arrangement embodied n the apparatus of my invention.
Figure 2:
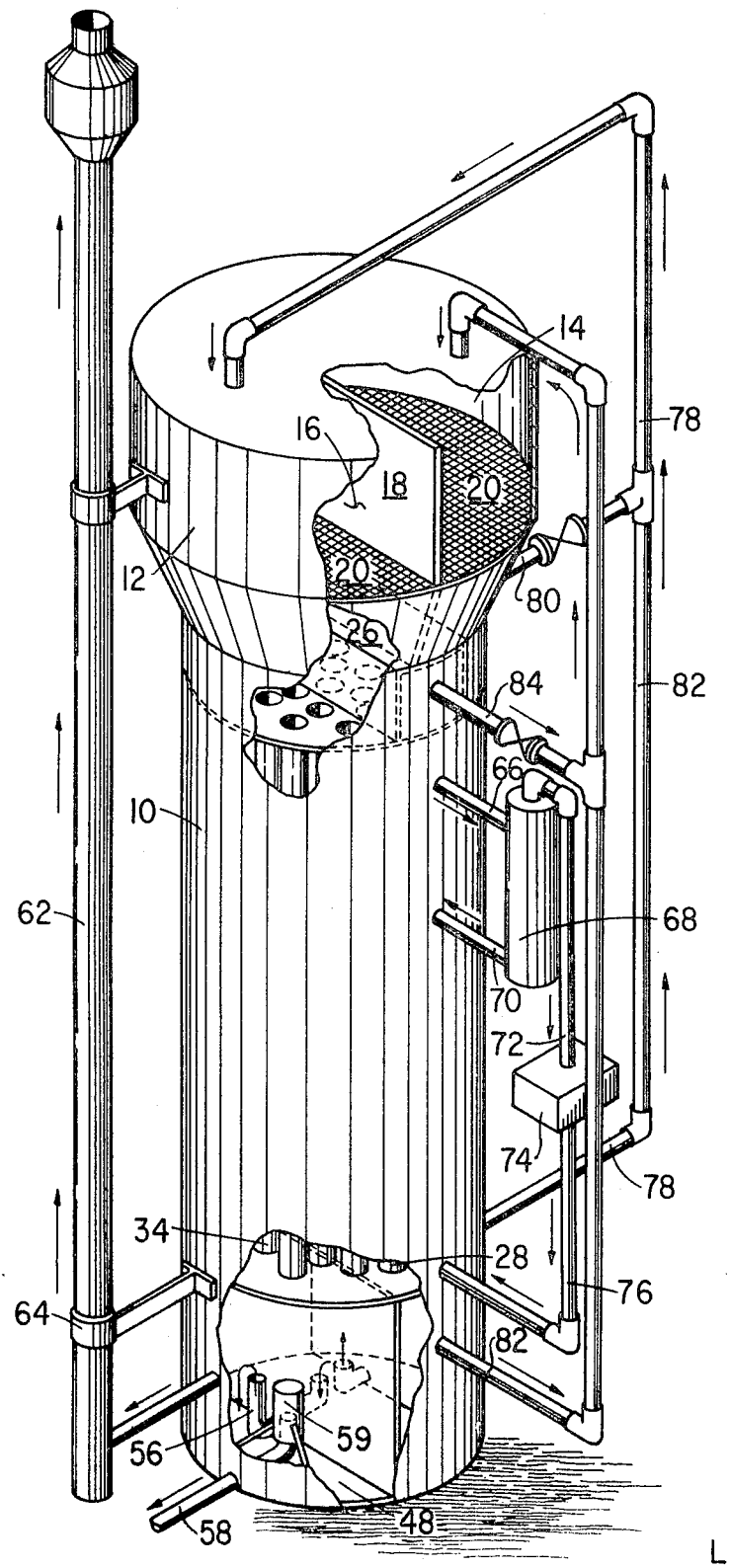
FIG. 2 is a rear view of FIG. 1.
Figure 3:
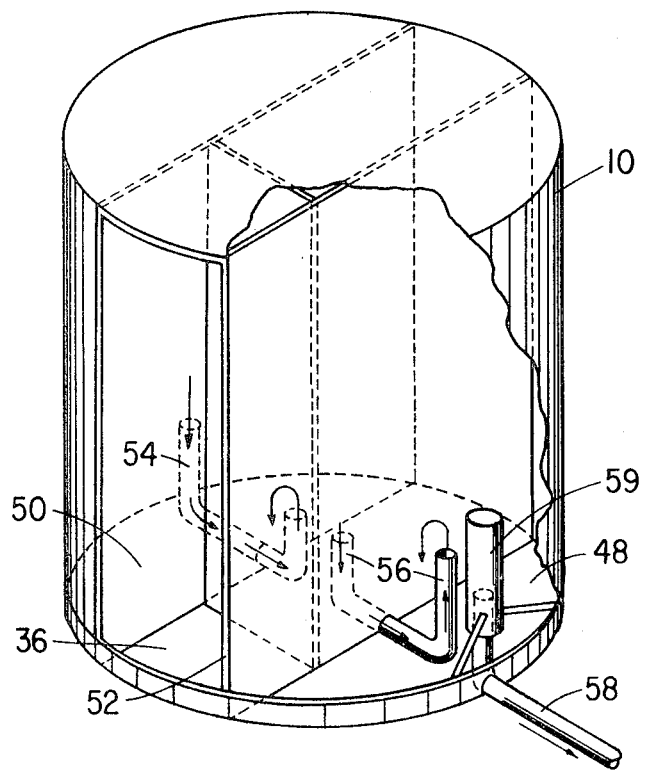
FIG. 3 is a fragmentary isometric view, partly in section, showing the liquid sulfur seal arrangement used to transfer sulfur in liquid form from certain separator compartments and to storage.
Figure 8:
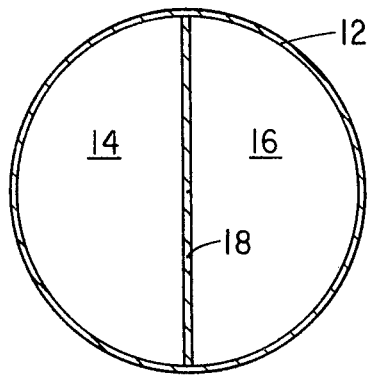
FIG. 8 is a cross-sectional view of FIG. 4 taken along line 8—8.
Figure 7:
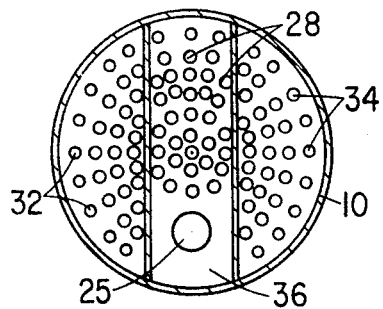
FIG. 7 is a cross-sectional view of FIG. 4 taken along line 7—7.
Figure 6:
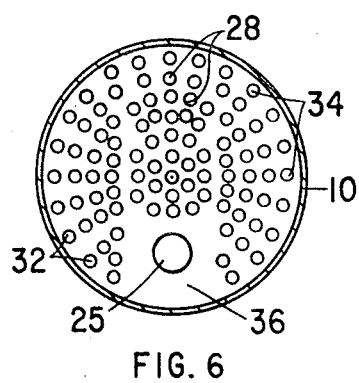
FIG. 6 is a cross-sectional view of FIG. 4 taken along line 6—6.
Figure 5:
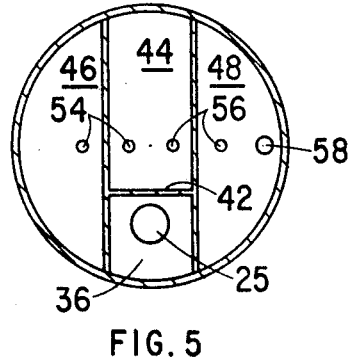
FIG. 5 is a cross-sectional view of FIG. 4 taken along line 5—5.
Figure 4:
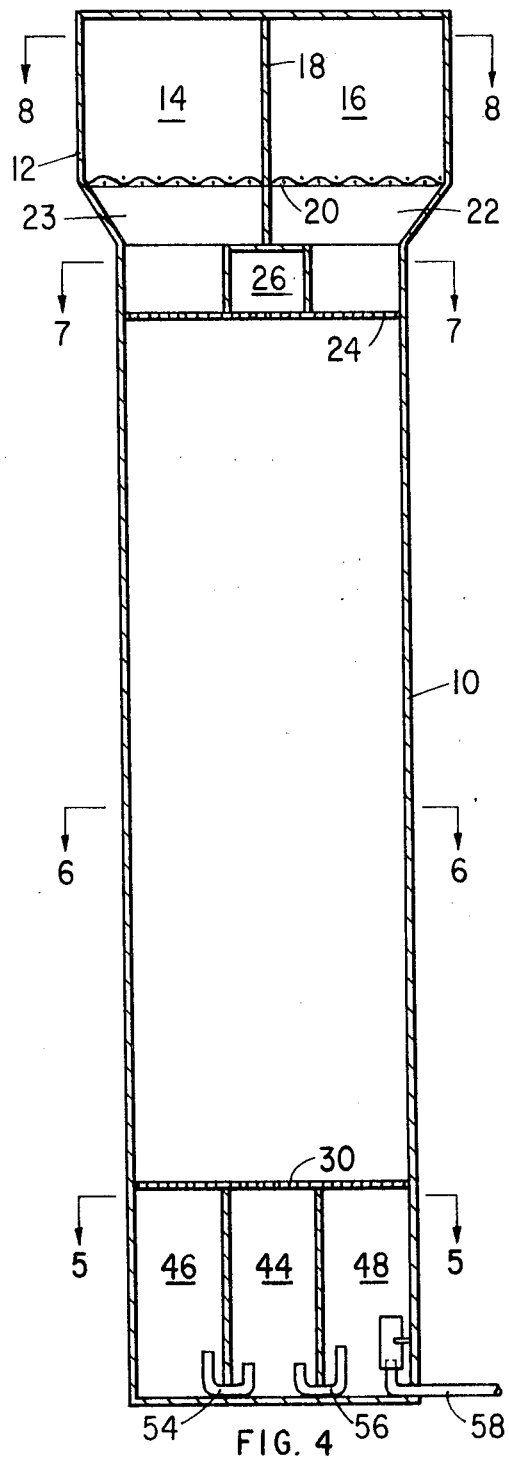
FIG. 4 is an elevational sectional view of the vertical sulfur plant of my invention.

The apparatus of FIGS. 1, 2 and 3 is enclosed in a generally cylindrical steel shell 10 on top of which is an expanded section 12 provided with catalyst chambers 14 and 16 formed within the section 12 by means of partition 18. At the base of the catalyst chambers is a screen 20, preferably stainless steel, for retention of the catalyst charge above liquid-disengaging spaces 22 and 23 defined by screen 20, tube sheet 24, and partition 18. Between spaces 22 and 23 is a plenum 26 into which combustion gases discharge from fire tube 25. At the rear of plenum 26 are second pass boiler tubes 28 extending downwardly to the tube sheet 30 which with tubes 32 and 34 define separate boiler and condenser sections within vessel 10. Below tube sheet 30 are four compartment, the first of which is access opening 36 through which acid gas line 38 and air line 40 run to a burner (not shown) at the base of fire tube 25. Forming the rear of opening 36 is plate 42 which likewise forms one end of compartment 44. On either side of plate 42 are disengaging or separating chambers 46 and 48 formed by the union of the walls of vessel 10 with partitions 50 and 52, respectively. Within separation chambers 44, 46 and 48, are liquid sulfur overflow and transfer tubes 54 and 56 shown in greater detail in FIG. 3. A sulfur transfer line 58 communicates with chamber 48. Within chamber 48 can over the top of discharge tube 58 is placed elongated cap 59 which aids in maintaining a liquid sulfur seal within the system during operation. Line 60 connects chamber 48 with incinerator stack 62 braced by support 64. An incinerator 85 is located near the top of stack 62. Air and fuel gas may be added for burning and heating objectionable wastes to the requirements of the locality before disposal to the atmosphere.

Just below tube sheet 24 is line 66 which takes steam to steam-water disengaging drum 68 with water returned to the boiler section from drum 68 via line 70. Steam is taken overhead by means of line 72 to a condensing system shown diagrammatically at 74. Condensate from the latter is transferred to the boiler section via line 76.

Near the top of separator compartment 46 is a transfer line 78 running to catalyst chamber 16. Valved line 80 communicates with both plenum 26 and line 78 to supply necessary amounts of reheat gas to bring the temperature of the unreacted gas in line 78 up to reaction level. A line 82 similarly extends from separator compartment 44 to catalyst chamber 14 with valved reheat line 84 connecting line 82 to plenum chamber 26.

In operation, a high hydrogen sulfide content gas, i.e., in excess of 45 percent hydrogen sulfide, is admitted to the burner through line 38 and there mixed with stoichiometric air coming from line 40. The resulting mixture is burned, and products of combustion and unreacted hydrogen sulfide are passed through fire tube 25 flowing through plenum chamber 26 and then passing downwardly through second pass boiler tubes 28 at a temperature ranging from about 1,200 down to about 375° F., the latter being the temperature at which sulfur condenses and emerges from the lower ends of tubes 28 into compartment 44. Under these conditions, the bulk of the elemental sulfur formed during combustion and Claus reaction of hydrogen sulfide and sulfur dioxide is condensed into liquid form and collects in separator compartment 44. The liquid product sulfur then flows into and through transfer tube 56, and out of the system to storage by means of line 58. The uncondensed gas which is confined to compartment 44 by means of line 58. the liquid sulfur seal in tube 56 is taken through line 82 at a temperature of 360° to 375° F., heated to a temperature of about 450° F. by blending with hot (900–1,200° F.) gas from plenum 26 via valved line 84 and thereafter the preheated mixture of unreacted hydrogen sulfide and sulfur dioxide is introduced into catalyst chamber 14 where further conversion of the reactants to free sulfur occurs. The effluent from chamber 14 flows into condenser tubes 32 and emerges therefrom at about 375° F. into separator compartment 46 where additional product sulfur in liquid form collects and flows through transfer tube 54 which in turn delivers the sulfur into compartment 44 and from there taken to storage as previously described.

The maintain gases are next taken from compartment 46 at about 360° F. through line 78, blended with hot gas carried from plenum 26 by means of valved line 80 to yield a reaction mixture having a temperature of about 450° F. This mixture is then introduced into catalyst chamber 16 where additional conversion of hydrogen sulfide and sulfur dioxide to free sulfur takes place and as previously described, the effluent from catalyst bed 16 flows into condensing tubes 34 ultimately discharging into separator compartment 48. The liquid sulfur in the discharge from tubes 34 is combined with product sulfur coming from compartments 44 and 46 and likewise removed from the unit by means of line 58.

It be appreciated, of course, that while I have described the apparatus of my invention as it is used in the so-called "straight-through" process where the feed gas is relatively concentrated with respect to hydrogen sulfide, such apparatus is equally suited to the well known "split flow" process when feed gas containing from about 15 or 20 percent to not more than about 40 percent hydrogen sulfide is employed. LIkewise, the principle of my invention can also be extended to single reactor or multireactor, e.g., three reactor, units.

I claim:

1. In an apparatus for the conversion of hydrogen sulfide to free sulfur, the combination comprising:

a generally cylindrical metal vessel having serially arranged therein a catalyst chamber at one end thereof, a heat exchange section having a first series of tubes, including a combustion chamber, arranged therein to define a boiler section, means for injection of air and hydrogen sulfide into said combustion chamber, a second series of tubes in said heat exchange section defining a condensing section, said second series of tubes being in noncommunicating relationship within said heat exchange section with said first series of tubes, said catalyst chamber and said condensing section being in direct communication with one another, a section at the opposite end of said vessel having separate fluidtight compartments therein in direct communication with said boiler section and with said condensing section, and means for withdrawing sulfur from said separate compartments.

2. In an apparatus adapted to operate in a vertical position for the conversion of hydrogen sulfide to free sulfur, the combination comprising, a generally cylindrical metal vessel having serially arranged therein a plurality of catalyst chambers at one end thereof, a heat exchange section having a first series of tubes, including a combustion chamber, arranged therein to define a boiler section, means for injection of air and hydrogen sulfide into said combustion chamber, a second series of tubes in said heat exchange section defining a condensing section therein, said second series of tubes being in noncommunicating relationship within said heat exchange section with said first series of tubes, said catalyst chambers each being in direct communication with separate tubes of said condensing section, a liquid-gas disengaging section at the opposite end of said vessel having fluidtight compartments therein separately communicating with said boiler section and with said condensing section, and means for withdrawing sulfur from said liquid-gas disengaging section.

3. The apparatus of claim 2 wherein said liguid-gas disengaging section contains means for transferring liquid sulfur to a single compartment therein.

4. In an apparatus adapted to operate in a vertical position for the conversion of hydrogen sulfide to free sulfur, the combination comprising, a generally cylindrical metal vessel having serially arranged therein catalyst chambers in one end thereof, a heat exchange section comprising a combustion chamber, means for injection of air and hydrogen sulfide into said combustion chamber, a first heat exchange means communicating with said combustion chamber, a second heat exchange means within said heat exchange section spaced apart from said first heat exchange means, said first and second heat exchange means being in noncommunicating relationship with one another, a liquid-gas disengaging section at the opposite end of said vessel having fluidtight compartments therein separately communicating with said first heat exchange means and with said second heat exchange means, means in said liquid-gas disengaging section for transferring liquid sulfur to a single compartment therein, a conduit communicating with the discharge end of said combustion chamber and with the exterior of said vessel, and means for withdrawing sulfur from said single compartment.

PO-1050
(5/69)

UNITED STATES PATENT OFFICE
CERTIFICATE OF CORRECTION

Patent No. 3,607,132        Dated September 5, 1971

Inventor(s) Lamar F. Sudduth

It is certified that error appears in the above-identified patent and that said Letters Patent are hereby corrected as shown below:

Column 1, line 60, "n" should be -- in --.

Column 2, line 63, delete "line 58."

Column 3, line 1, "maintain" should be --remaining--.

Signed and sealed this 7th day of March 1972.

(SEAL)
Attest:

EDWARD M. FLETCHER, JR.
Attesting Officer

ROBERT GOTTSCHALK
Commissioner of Patents